US011631269B1

(12) United States Patent
Ketharaju et al.

(10) Patent No.: US 11,631,269 B1
(45) Date of Patent: Apr. 18, 2023

(54) DOCUMENT FRAUD DETECTION (71) Applicant: Wells Fargo Bank, N.A., San Francisco, CA (US)

(72) Inventors: Rameshchandra Bhaskar Ketharaju, Hyderabad (IN); Ramanathan Ramanathan, Bellevue, WA (US); Ramakrishna Bejjanki, Hyderabad (IN); Sumanth Kumar Charugundla, Hyderabad (IN); Prasanna K. Ammiraju, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 310 days.

(21) Appl. No.: 16/985,012

(22) Filed: Aug. 4, 2020

Related U.S. Application Data

(63) Continuation of application No. 16/659,087, filed on Oct. 21, 2019, now Pat. No. 10,733,435, which is a continuation of application No. 15/389,630, filed on Dec. 23, 2016, now Pat. No. 10,452,908.

(51) Int. Cl.
G06K 9/00 (2022.01)
G06V 30/418 (2022.01)
G06V 10/42 (2022.01)
G06V 40/40 (2022.01)

(52) U.S. Cl.
CPC ............ G06V 30/418 (2022.01); G06V 10/42 (2022.01); G06V 40/40 (2022.01)

(58) Field of Classification Search
CPC ....... G06V 30/418; G06V 10/42; G06V 40/40
See application file for complete search history.

(56) References Cited

U.S. PATENT DOCUMENTS

| 3,802,724 A | 4/1974 | Gosnell |
| 4,202,626 A | 5/1980 | Mayer et al. |
| 4,321,672 A * | 3/1982 | Braun ............... G06Q 20/40 705/45 |
| 5,602,933 A | 2/1997 | Blackwell et al. |

(Continued)

FOREIGN PATENT DOCUMENTS

| WO | WO-0141051 A1 * | 6/2001 | ......... G06K 9/00154 |
| WO | 2004/095195 A2 | 11/2004 | |

OTHER PUBLICATIONS

Forgery Detection and Value Identification of Euro Banknotes, Arcangelo Bruna et al., ISSN 1424-8220, Feb. 18, 2013, pp. 2515-2529 (Year: 2013).*

(Continued)

Primary Examiner — Jayesh A Patel
(74) Attorney, Agent, or Firm — Womble Bond Dickinson (US) LLP (57) ABSTRACT

Potentially fraudulent documents can be identified automatically and flagged for further review. Document fraud detection can include a number of fraud detection tests, where if the document fails any of the tests, the document can be flagged for further review. Various tests can be performed that seek to determine whether a document has been altered. In one instance, a financial instrument can be scanned and analyzed to identify one or more layers associated with the financial instrument from a scanned representation, and a check of transaction details can be triggered when the financial instrument is associated with multiple layers.

20 Claims, 10 Drawing Sheets

(56) References Cited

U.S. PATENT DOCUMENTS

| | | | |
|---|---|---|---|
| 5,748,780 A | 5/1998 | Stolfo | |
| 5,777,342 A * | 7/1998 | Baer | G03F 7/70058 |
| | | | 250/492.2 |
| 6,073,121 A * | 6/2000 | Ramzy | G06Q 20/042 |
| | | | 380/246 |
| 6,097,834 A | 8/2000 | Krouse et al. | |
| 6,159,585 A | 12/2000 | Rittenhouse | |
| 6,188,787 B1 | 2/2001 | Ohmae et al. | |
| 6,269,169 B1 | 7/2001 | Funk et al. | |
| 6,353,481 B1 | 3/2002 | Lee | |
| 6,373,965 B1 | 4/2002 | Liang | |
| 6,464,134 B1 * | 10/2002 | Page | G07D 7/0047 |
| | | | 235/375 |
| 6,608,670 B2 | 8/2003 | Nottke et al. | |
| 6,777,704 B2 | 8/2004 | Giering | |
| 6,839,128 B2 | 1/2005 | Premjeyanth et al. | |
| 7,067,824 B2 | 6/2006 | Muller et al. | |
| 7,516,888 B1 * | 4/2009 | Kundu | G07F 17/3241 |
| | | | 235/383 |
| 7,546,320 B2 * | 6/2009 | Jenkins | G06F 8/70 |
| 7,584,128 B2 | 9/2009 | Mason et al. | |
| 7,587,066 B2 * | 9/2009 | Cordery | G06V 30/158 |
| | | | 705/51 |
| 7,661,587 B1 * | 2/2010 | Mok | G07D 7/202 |
| | | | 235/375 |
| 7,873,200 B1 | 1/2011 | Oakes et al. | |
| 8,059,858 B2 | 11/2011 | Brundage et al. | |
| 8,081,304 B2 | 12/2011 | Furness et al. | |
| 8,086,017 B2 | 12/2011 | He et al. | |
| 8,194,237 B2 | 6/2012 | Cronin et al. | |
| 8,332,240 B1 | 12/2012 | Garver et al. | |
| 8,491,186 B2 | 7/2013 | Lawandy | |
| 8,520,888 B2 | 8/2013 | Spitzig et al. | |
| 8,655,046 B1 | 2/2014 | Csulits et al. | |
| 8,708,227 B1 | 4/2014 | Oakes et al. | |
| 8,733,654 B2 * | 5/2014 | Kayani | G07D 7/206 |
| | | | 235/379 |
| 8,929,640 B1 | 1/2015 | Mennie et al. | |
| 9,195,889 B2 | 11/2015 | Klein et al. | |
| 9,292,989 B2 | 3/2016 | Lawandy | |
| 9,508,209 B2 * | 11/2016 | Bu | H04L 9/3226 |
| 9,905,069 B1 | 2/2018 | Goltsos | |
| 9,952,942 B2 | 4/2018 | Gunsolley et al. | |
| 9,972,156 B1 | 5/2018 | Mennie et al. | |
| 10,452,908 B1 * | 10/2019 | Ramanathan | G06V 10/42 |
| 10,733,435 B1 * | 8/2020 | Ketharaju | G06V 30/418 |
| 2002/0001393 A1 | 1/2002 | Jones et al. | |
| 2003/0099379 A1 | 5/2003 | Monk et al. | |
| 2003/0156274 A1 | 8/2003 | Massen et al. | |
| 2003/0225705 A1 | 12/2003 | Park et al. | |
| 2004/0064453 A1 | 4/2004 | Ruiz et al. | |
| 2004/0136572 A1 | 7/2004 | Lacy | |
| 2004/0218801 A1 | 11/2004 | Houle et al. | |
| 2004/0223637 A1 | 11/2004 | Houle et al. | |
| 2004/0228513 A1 | 11/2004 | Houle et al. | |
| 2004/0228514 A1 | 11/2004 | Houle et al. | |
| 2005/0029349 A1 * | 2/2005 | McGregor | H04L 9/0866 |
| | | | 235/380 |
| 2005/0069170 A1 | 3/2005 | Alasia et al. | |
| 2005/0091500 A1 | 4/2005 | Okazaki | |
| 2005/0137982 A1 * | 6/2005 | Michelassi | G06Q 30/04 |
| | | | 705/50 |
| 2005/0196013 A1 | 9/2005 | Rhoads | |
| 2005/0211914 A1 | 9/2005 | Franken et al. | |
| 2005/0213078 A1 | 9/2005 | Grob et al. | |
| 2006/0018520 A1 | 1/2006 | Holloran | |
| 2006/0100893 A1 | 5/2006 | Cunningham et al. | |
| 2006/0124727 A1 * | 6/2006 | Kotovich | G06Q 20/403 |
| | | | 235/379 |
| 2006/0144924 A1 * | 7/2006 | Stover | G07F 7/12 |
| | | | 235/379 |
| 2006/0161788 A1 | 7/2006 | Turpin et al. | |
| 2006/0164682 A1 | 7/2006 | Lev | |
| 2006/0282383 A1 * | 12/2006 | Doran | G06Q 20/24 |
| | | | 705/45 |
| 2007/0106561 A1 * | 5/2007 | Lubow | B42D 25/333 |
| | | | 382/118 |
| 2007/0110311 A1 | 5/2007 | Houle et al. | |
| 2007/0110312 A1 | 5/2007 | Houle et al. | |
| 2007/0110313 A1 | 5/2007 | Houle et al. | |
| 2007/0172106 A1 | 7/2007 | Paraskevakos | |
| 2007/0203732 A1 * | 8/2007 | Griegel | G06Q 30/02 |
| | | | 235/379 |
| 2007/0217669 A1 * | 9/2007 | Swift | G06Q 40/00 |
| | | | 382/139 |
| 2007/0262136 A1 * | 11/2007 | Ou | G06Q 20/40 |
| | | | 235/380 |
| 2007/0297664 A1 | 12/2007 | Blaikie | |
| 2008/0011824 A1 * | 1/2008 | Swift | G06Q 20/4014 |
| | | | 235/379 |
| 2008/0037855 A1 * | 2/2008 | Silverbrook | G06Q 20/3674 |
| | | | 382/135 |
| 2008/0086420 A1 * | 4/2008 | Gilder | G06Q 20/04 |
| | | | 705/35 |
| 2008/0140580 A1 * | 6/2008 | Beenau | H04L 63/0861 |
| | | | 705/76 |
| 2009/0008924 A1 | 1/2009 | Ophey et al. | |
| 2009/0242623 A1 * | 10/2009 | Bonds | G06Q 40/00 |
| | | | 235/379 |
| 2010/0189316 A1 | 7/2010 | Walch | |
| 2010/0245877 A1 | 9/2010 | Wei et al. | |
| 2012/0051657 A1 | 3/2012 | Lamanna et al. | |
| 2012/0226600 A1 * | 9/2012 | Dolev | G06Q 20/401 |
| | | | 382/137 |
| 2013/0013491 A1 * | 1/2013 | Selway | G06Q 20/042 |
| | | | 705/39 |
| 2013/0103582 A1 | 4/2013 | Singfield | |
| 2013/0200606 A1 | 8/2013 | Omar | |
| 2013/0287284 A1 | 10/2013 | Nepomniachtchi et al. | |
| 2015/0064419 A1 * | 3/2015 | Stolarz, Jr. | C09D 11/50 |
| | | | 428/199 |
| 2015/0146963 A1 | 5/2015 | Klein et al. | |
| 2015/0279143 A1 | 10/2015 | Blair | |
| 2016/0005252 A1 * | 1/2016 | Kayani | G07D 11/16 |
| | | | 194/207 |
| 2016/0055375 A1 | 2/2016 | Neavin | |
| 2016/0203364 A1 * | 7/2016 | Nepomniachtchi | |
| | | | G06V 30/2253 |
| | | | 382/137 |
| 2016/0275745 A1 * | 9/2016 | Sheng | G07D 11/20 |
| 2018/0295248 A1 | 10/2018 | Fielding et al. | |

OTHER PUBLICATIONS

Forensic Detection of Fraudulent Alteration in Ball-Point Pen Strokes, Rajesh Kumar et al., IEEE, Apr. 2012, pp. 809-820 (Year: 2012).*

On Automatic Authenticity Verification of Printed Security Documents, Utpal Garain et al., IEEE, 2008, pp. 706-713 (Year: 2008).*

Garain et al., "On Automatic Authenticity Verification of Printed Security Documents", IEEE, 2008, pp. 706-713.

* cited by examiner

DOCUMENT FRAUD DETECTION

CROSS-REFERENCE TO RELATED APPLICATIONS

This application is a continuation of U.S. patent application Ser. No. 16/659,087, filed Oct. 21, 2019, and entitled "DOCUMENT FRAUD DETECTION," which is a continuation of U.S. patent application Ser. No. 15/389,630, filed Dec. 23, 2016, and entitled "DOCUMENT FRAUD DETECTION." The entireties of these applications are incorporated herein by reference.

BACKGROUND

Check fraud costs customers hassle and financial institutions losses. Advances in counterfeiting technology have made it increasingly easy to create realistic counterfeit checks used to defraud banks and its customers and other businesses. Conventional methods of reducing check fraud include providing watermarks on the checks, fingerprinting non-customers that seek to cash checks, positive pay systems and reverse positive pay systems. Positive pay systems feature methods in which the bank and its customers work together to detect check fraud by identifying items presented for payment that the customers did not issue. With reverse positive pay systems, each bank customer maintains a list of checks issued and informs the bank which checks match its internal information. Although these check fraud security systems have been somewhat effective in deterring check fraud, they suffer from a multiplicity of drawbacks. For example, these systems are generally very slow and prohibitively expensive.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Document fraud detection is disclosed herein related to detecting forged and fraudulent financial instruments. Nevertheless, the principles disclosed are applicable to detecting fraudulent documents in a variety of types and industries. These documents can include financial statements, legal documents that are commonly forged apart from checks, such as money orders, pay orders, demand drafts, deeds/titles, securities, bonds, court seals, corporate documents, identity cards, etc. Various means can be employed to detect unauthorized alteration of document information.

For these considerations, as well as other considerations, a system is provided that comprises a processor coupled to a memory that stores instructions that, when executed by the processor, cause the processor to scan a financial instrument, determine a number of layers associated with the financial instrument from a scanned representation of the financial instrument, and trigger a check of transaction details on the financial instrument when the financial instrument is associated with multiple layers. In one instance a layer can be a writing layer that captures writing that occurs at different times. In another instance, a layer can be an indent layer that captures one or more indentations on a financial instrument. The system can also include instructions that cause the processor to identify the transaction details on the financial instrument, compare the transaction details to a transaction detail pattern that is based on previous transactions, and flag the financial instrument for further review when a result of the compare is outside a predetermined threshold. Further, the system can include instructions that cause the processor to identify text associated with one or more indentations and flag the financial instrument for further review if the text does not match the transaction details of a previous financial instrument.

A method is disclosed that comprises scanning a financial instrument, determining a number of layers associated with the financial instrument from a scanned representation of the financial instrument, and triggering a check of transaction details on the financial instrument when the financial instrument is associated with multiple layers. In one instance, the check can correspond to identifying the transaction details on the financial instrument, comparing the transaction details to a transaction detail pattern that is based on one or more previous transactions, and flagging the financial instrument for further review when a result of the compare is outside a predetermined threshold. The method also comprises identifying text associated with one or more indentations on an indentation layer and flagging the financial instrument for further review when text does not match the transaction details of a previous financial instrument. The method further comprises detecting a layer by scanning the financial instrument from more than one angle or in different lighting. Further, the method includes comparing the scanned representation of the financial instrument to a predetermined design to determine a difference and flagging the financial instrument for further review when the difference exceeds a predetermined threshold. The method also comprises performing biometric or thermal scanning of the financial instrument, comparing a scan result of performing to a predetermined biometric or thermal pattern, and flagging the financial instrument for further review when a result of the comparing is outside a predetermined threshold.

Another method is disclosed that executes, on a processor, instructions that cause the processor to perform operations. The operations comprise scanning a financial instrument, identifying one or more layers associated with the financial instrument from a scanned representation, wherein a layer captures writing that occurs at different times, and triggering a check of transactional details on the financial instrument when the financial instrument is associated with multiple layers. The instructions further cause the processor to perform operations comprising identifying the transaction details on the financial instrument, comparing the transaction details to a transaction detail pattern that is based on one or more previous transactions, and flagging the financial instrument for further review when a result of the compare is outside a predetermined threshold. Further operations include identifying text associated with one or more indentations on an indentation layer and flagging the financial instrument for further review when text does not match the transaction details of a previous financial instrument.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will

DETAILED DESCRIPTION

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments, a document fraud detection system can be provided for identifying fraudulent financial instruments. The document fraud detection system can include up to three steps of fraud detection, where if the document fails any of the three steps, the document or financial instrument can be flagged for further review. In another embodiment, the document fraud detection system can score each of the three tests, where the scores represent the likelihood that the document or financial instrument is fraudulent. If the combined score satisfies a predetermined criterion, the document or financial instrument can be flagged as potentially fraudulent. The three tests can include analyzing a scanned image of the financial instrument and comparing to other similar financial instruments to determine if there have been any alterations. The second test can compare indents to previous financial instruments, and the third test can analyze chemical and biometric factors that may indicate whether the document has been altered.

The document fraud detection system begins the process by scanning a financial instrument and matching a pattern of the financial instrument medium to a predetermined design. If the pattern matches the predetermined design to within some predetermined tolerance, the financial instrument passes a first verification check, wherein the scanning the financial instrument also determines a number of layers to the financial instrument. These layers can represent various times that document has been altered by different people or objects.

In response to determining that there are multiple layers to the financial instrument, the system can perform a second verification check where transaction details on the financial instrument are compared to a transaction detail pattern based on a previous transaction. If the transaction details match the transaction detail pattern within a second threshold, the financial instrument passes.

A third verification check includes performing biometric and thermal scanning and comparing scan results to a predetermined biometric and thermal pattern; wherein if the scan results match the predetermined biometric and thermal pattern within a third threshold, the financial instrument passes. If the document fails any of the first, second or third verification checks, the document is flagged for further review.

In an embodiment, the scanning can be performed by either an infrared scanner, optical scanner, or x-ray scanner. Additionally, if it is determined that the financial instrument only contains a single layer, the comparing the transaction details can be skipped. The transaction detail pattern can be based on some function of pattern of payments, available balance, check issuance dates, and payee information. Furthermore, the predetermined biometric and thermal pattern can be based on a function of handwriting analysis based on the previous financial instrument, a heat map of hand contact with a medium of the financial instrument, and biometric information received from a chemical analysis of the financial instrument.

During the third verification check, various information gathered can relate to the position of hand or gesture patterns at the location when the document was signed, hand contact with check leaf/sheet location, imprints, loss of moisture, augmented patterns, figure inputs on the check, pen/ink mark at starting and ending of each letter. The signing location, sweat marks, DNA, Color of the ink, and its reaction with paper, and time of reaction with paper, printed vs. manual alterations, font, color, size of the font, printer type (inkjet/laserjet) can also be compared.

Figure 1:
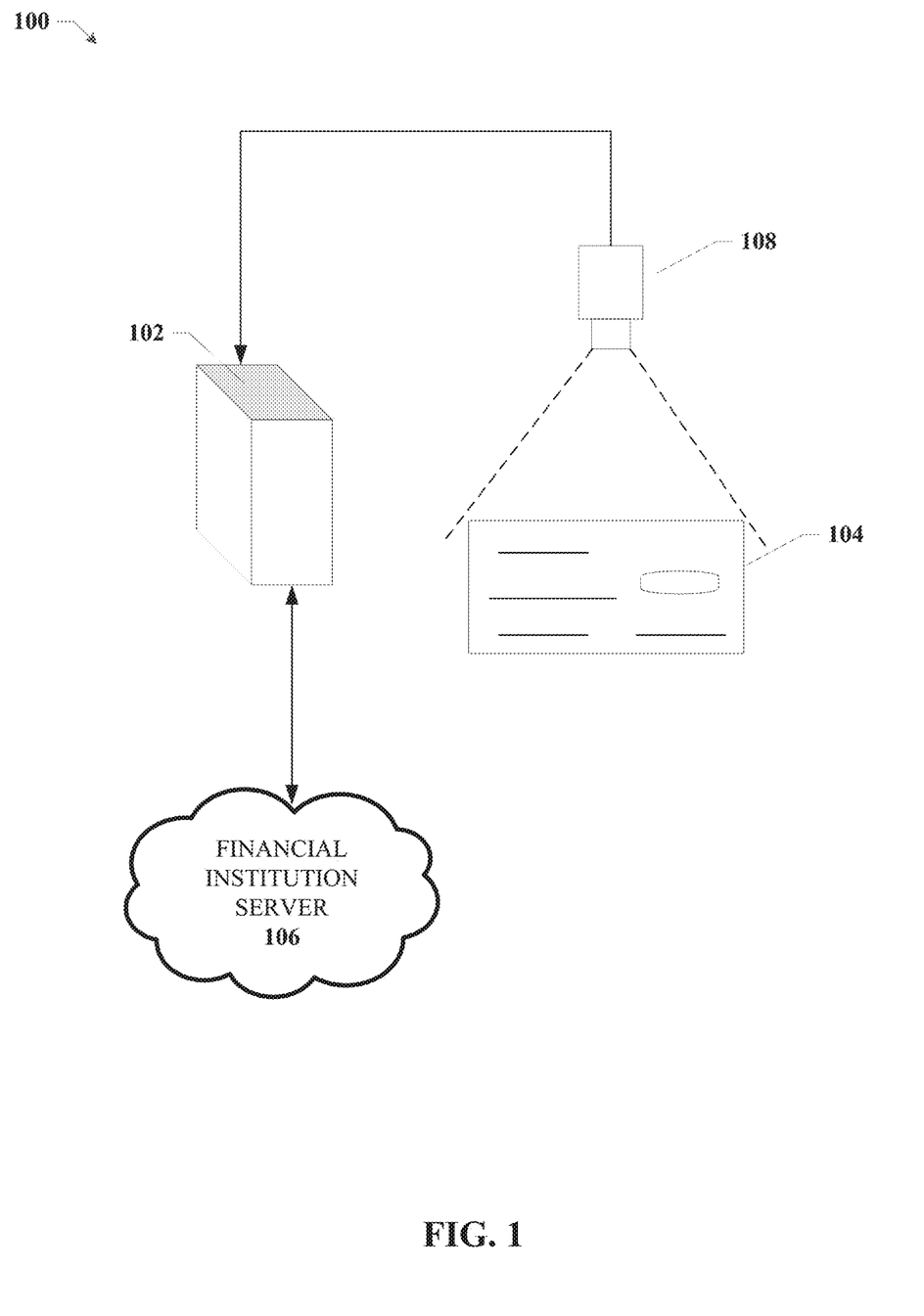
FIG. 1 is an illustration of an example system for detecting potentially fraudulent financial instruments in accordance with one or more aspects of the disclosure.

Turning now to FIG. 1, illustrated is an illustration of an example system 100 for detecting potentially fraudulent financial instruments in accordance with one or more aspects of the disclosure. In the embodiment shown in FIG. 1, a document fraud detection device 102 can include a scanner or a camera or other imaging device 108 that can generate a digital image of a financial instrument 104 in order to analyze the financial instrument 104. The document fraud detection device 102 can use previous transaction details and scanned images retrieved from a financial institution server 106 when analyzing the validity of the financial instrument 104.

In an embodiment, the financial instrument 104 can be any document or financial instrument where the authenticity of the document can be verified. The types of documents that financial instrument 104 can be include, but is not limited to: a check, a money order, a pay order, a demand draft, a deed or title, a security document, a bond, a court seal, a corporate document, or an identity card.

In an embodiment, imaging device 108 can optically scan or image the financial instrument 104 in order to determine the authenticity of the financial instrument 104. The resulting digital image can be analyzed by the document fraud detection device 102 using a multipart process in order to determine whether the financial instrument 104 is valid or has been fraudulently altered.

In an embodiment, the document fraud detection device 102 can compare the form of financial instrument 104 to approved forms. Depending on the type of document that financial instrument 104 is, there may be a set of standardized dimensions of the paper or medium that makes up the financial instrument 104. Similarly, the layout of the document may be standardized or be selected from a set of layouts. The document fraud detection device 102 can compare the dimensions and layout of financial instrument 104 to the dimensions and layout of the approved forms and if there are any discrepancies greater than a predetermined threshold, the financial instrument 104 can be flagged as potentially fraudulent. The document fraud detection device 102 can determine what type of document financial instrument 104 is, and send a request for relevant data of layouts and dimensions of approved forms to financial institution server 106 which can return the data that is used to compare the financial instrument 104 thereunto.

In an embodiment, the document fraud detection device 102 can base the analysis of the financial instrument 104 on previous transactions. For instance, document fraud detection device 102 can determine that the financial instrument 104 is a check belonging to a series of checks (0001, 0002, etc). Document fraud detection device 102 can retrieve images of the financial instruments from the previous transactions to compare the patterns to see if the financial instrument 104 matches. As an example, if all the checks in a book of checks have a pattern, and the financial instrument 104 does not match the pattern, it is possible that the financial instrument 104 may be fraudulent, and document fraud detection device 102 can flag the check as such. As disclosed herein, the pattern of the financial instruments can refer to ornamental designs on the financial instruments, sizes and shapes of the financial instruments, layout of text and boxes on the financial instruments, size and fonts of text on the financial instruments, and analysis of watermarks and other fluorescent markers on the financial instruments.

In an embodiment, the imaging device 108 can include imaging components that capture electromagnetic radiation in wavelengths other than the visible spectrum. For instance, the imaging device 108 can record infrared (IR), ultraviolet (UV), or X-ray images in order to compare patterns and analyze the financial instrument 104. In other embodiments, the financial instrument 104 can be illuminated with IR, UV, or X-ray radiation and then imaged in visible or other spectrums in order to gain additional information about the patterns and structure of the financial instrument 104. For example, financial instrument 104 can be illuminated with UV radiation in order to cause a fluorescent material on the financial instrument 104 to radiate visible light. Imaging device 108 can image record the visible light in order to determine the validity of the financial instrument 104.

In an embodiment, document fraud detection device 102 can determine whether or not the financial instrument 104 contains a plurality of layers. A layer can be a piece of paper that covers up writing on the financial instrument 104. A layer could also be writing or printing that was performed at a later time than an initial writing. For instance, a "1" could be changed to a "9", and the document fraud detection device 102 can determine that the edit was made using a different color ink, or different writing style and determine that the financial instrument comprises multiple 'layers' of edits which may be indicative of fraud. In an embodiment, to determine whether there are multiple layers present, the imaging device 108 may be moved, or the financial instrument may be moved in order that the images are captured of the financial instrument at different angles to facilitate detection of the plurality of layers. In other embodiments, there may be a second imaging device (not shown) that can capture an image of the financial instrument 104 at a different angle.

In an embodiment, the multiple layers can include writing layers and indent layers. As checks in checkbook are written on, they often leave indents on the checks below. By taking images of the financial instrument 104 at different angles and with different lighting, these indents can be analyzed to determine what words the indents correspond to. These indents can be considered to be a different layer than the more clearly visible writing layer that has the payment details associated with financial instrument 104 and not the previous financial instrument.

If the document fraud detection device 102 determines that there are multiple layers, the document fraud detection device 102 can compare transaction details on the financial instrument to a transaction detail pattern based on one or more previous transactions. The transaction detail pattern can encompass such factors as pattern of payments, available balance, check issuance dates, and payee information. For instance, if a payment is out of the ordinary based on previous payment details, the financial instrument 104 can be flagged as potentially fraudulent. As an example, if the user has a history of making $100.00 payments to a certain payee on a schedule, if the financial instrument 104 doesn't match the history, by either deviating in the amount of money or by having a different date than expected, the financial instrument 104 can be flagged as potentially fraudulent.

The document fraud detection device 102 can also match the words associated with the indents to previous financial transactions, as retrieved from the financial institution server 106. If the indents do not match the previous financial instruments transaction details, the financial instrument 104 can be flagged as potentially fraudulent.

Figure 2:
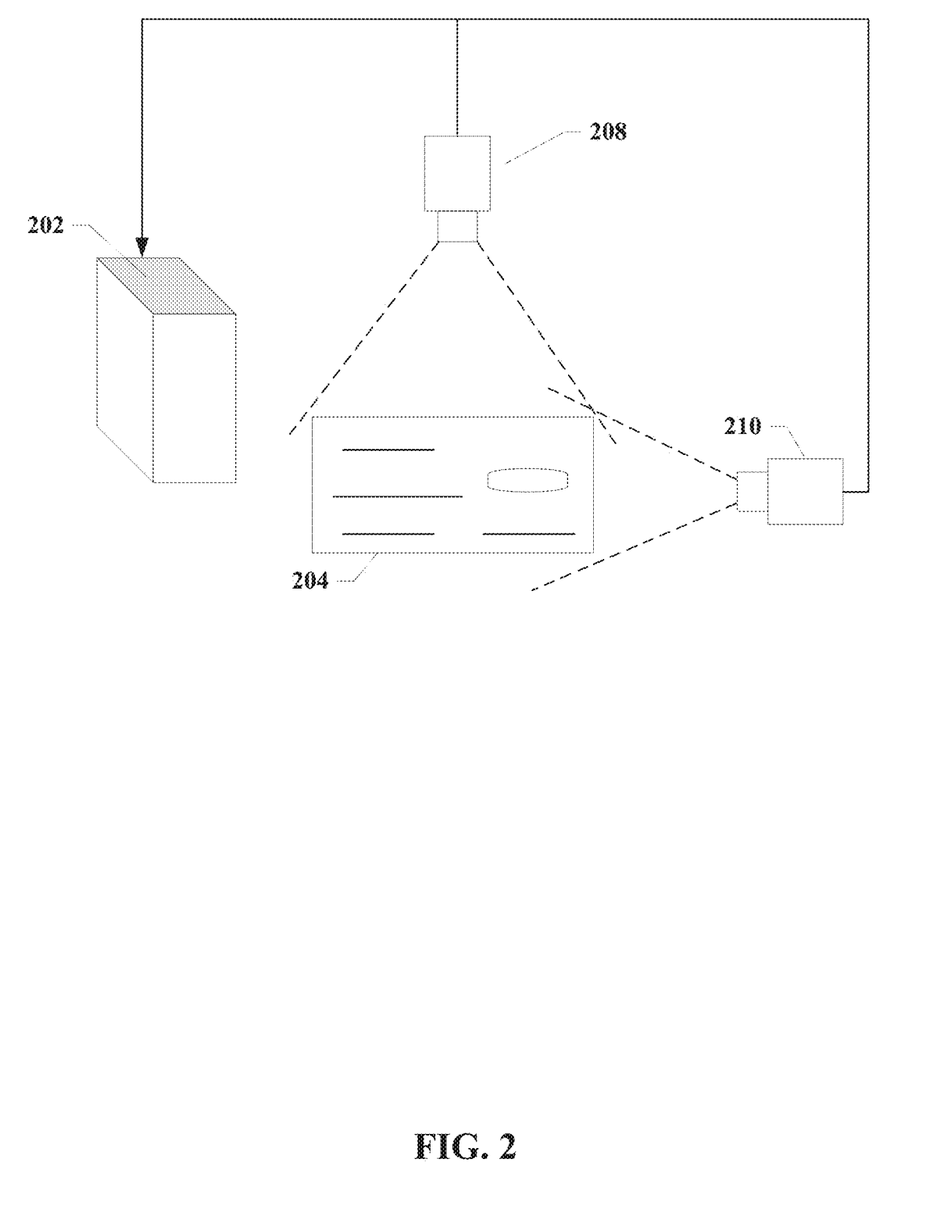
FIG. 2 is an illustration of an example system for performing thermal and biometric scanning to identify fraudulent financial instruments in accordance with one or more aspects of the disclosure.

Turning now to FIG. 2, illustrated is an example system 200 for performing thermal and biometric scanning to identify fraudulent financial instruments in accordance with one or more aspects of the disclosure.

In an embodiment, after the document fraud detection device 202 has analyzed the pattern of the financial instrument 204 and compared it to previous financial instruments and compared the transaction details of the financial instrument 204 and compared them to previous transactions to determine whether or not the financial instrument 204 may be fraudulent, the document fraud detection device 202 can scan the financial instrument 204 using at least one of an infrared (IR) scanner 208 and/or a x-ray/UV scanner 210 to perform thermal and biometric analysis of the financial instrument 204. The document fraud detection device 202 can compare the scan results to a predetermined biometric and thermal pattern to see if the results match the pattern to within some predetermined degree of similarity. If the scan results do not match to within the predetermined degree of similarity, the financial instrument 204 can be flagged as potentially fraudulent.

The IR scanner 208 and the x-ray/UV scanner 210 can scan the financial instrument and analyze fingerprints left on the financial instrument 204, handwriting style, sweat marks left on the financial instrument 204, determine types of ink/toner used on the financial instrument 204, how the ink has reacted with the paper, DNA of the person, how long the ink has been on the paper, loss of moisture from the paper, smudge marks on the paper, and other information. The predetermined biometric and thermal pattern can take each of these factors into consideration based on previous transactions and previous financial instruments and after scanning using scanners 208 and 210, document fraud detection device 202 can determine whether the scan results of financial instrument 204 match the predetermined pattern. If the scan results do not match to within the predetermined degree of similarity, the financial instrument 204 can be flagged as potentially fraudulent. As an example, the document fraud detection device can determine an age of ink via the thermal scanning and matching the age of the ink to a date on the financial instrument.

Figure 3:
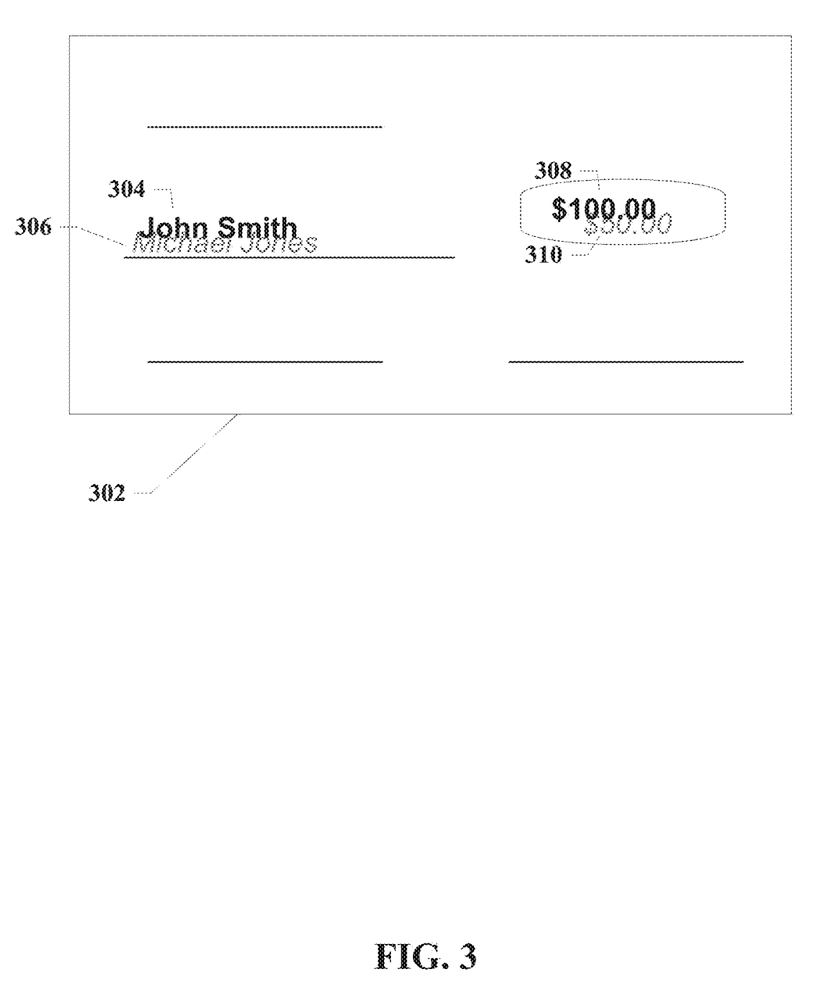
FIG. 3 is an illustration of an example system that compares multiple layers to identify fraudulent financial transactions in accordance with one or more aspects of the disclosure.

Turning now to FIG. 3, illustrated is an example system 300 that compares multiple layers to identify fraudulent financial transactions in accordance with one or more aspects of the disclosure.

Financial instrument 302 is shown as an example of the types of layers that a document can have, as discussed with respect to FIG. 1. As described in FIG. 1, a fraud detection system can determine whether or not the financial instrument 302 contains a plurality of layers. A layer can be a piece of paper that covers up writing on the financial instrument 302. A layer could also be writing or printing that was performed at a later time than an initial writing. For instance, the payee information John Smith 304 could be written over a previous payee Michael Jones 306. Additionally, or alternatively, a payment amount $100 308 could be written over amount $50 310. In other embodiments, a piece of paper or other writing medium could cover up payee 306 and/or amount 310 and include payee 304 and/or amount 308.

In another embodiment, payee 306 and amount 310 can be indents left on the financial instrument 302 from a previous transaction on a previous financial instrument. The fraud detection system (e.g., document fraud detection system 102) can retrieve the previous transaction details from a financial institution server (e.g., server 106) in order to ensure the indents match the previous transaction. If the indents do not match, the document 302 may be flagged as potentially fraudulent.

Figure 4:
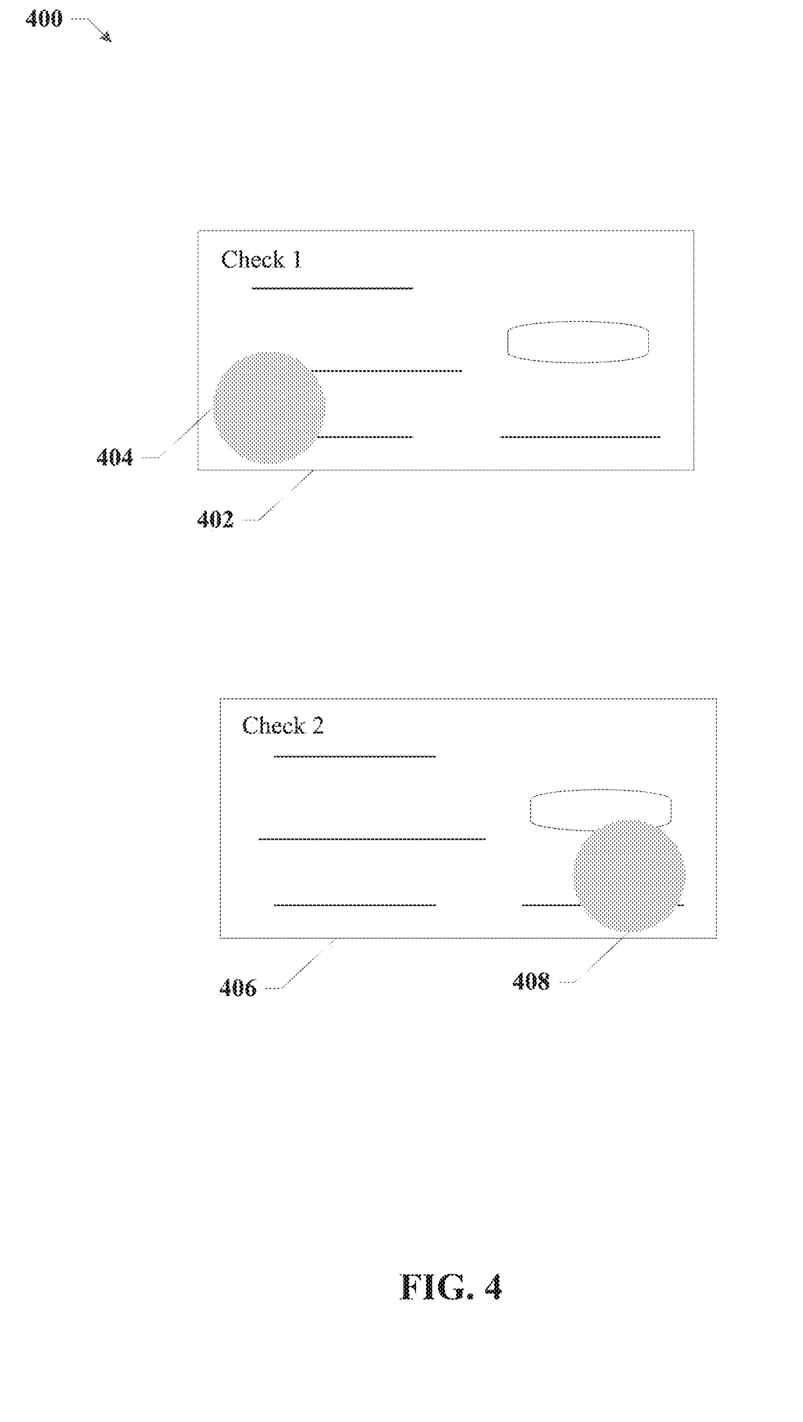
FIG. 4 is an illustration of an example system that compares sweat marks to identify fraudulent financial transactions in accordance with one or more aspects of the disclosure.

Turning now to FIG. 4, illustrated is an example system 400 that compares sweat marks to identify fraudulent financial transactions in accordance with one or more aspects of the disclosure.

The embodiment shown in FIG. 4 is an illustration of an aspect of FIG. 2 discussed above. Financial instrument 406 can be a document that the document fraud detection systems disclosed in FIGS. 1 and 2 are trying to determine the validity of. The infrared scanner 208 or X-ray/UV scanner 210 can scan the financial instrument 406 and the document fraud detection device 202 can determine that a sweat mark 408, based on residual moisture or chemical composition changes in the paper or medium of the financial instrument 406, is on the right side of the instrument 406. This may indicate a particular writing style, or that the person writing the check is left-handed. The document fraud detection device 202 can retrieve data about one or more previous financial transactions and instruments, such as financial instrument 402, where the sweat mark 404 appears on the left side of the financial instrument 402. This can indicate that a different person wrote the checks, even if they were signed with the same name. The document fraud detection device 202 can thus flag the financial instrument 406 as potentially fraudulent.

Figure 5:
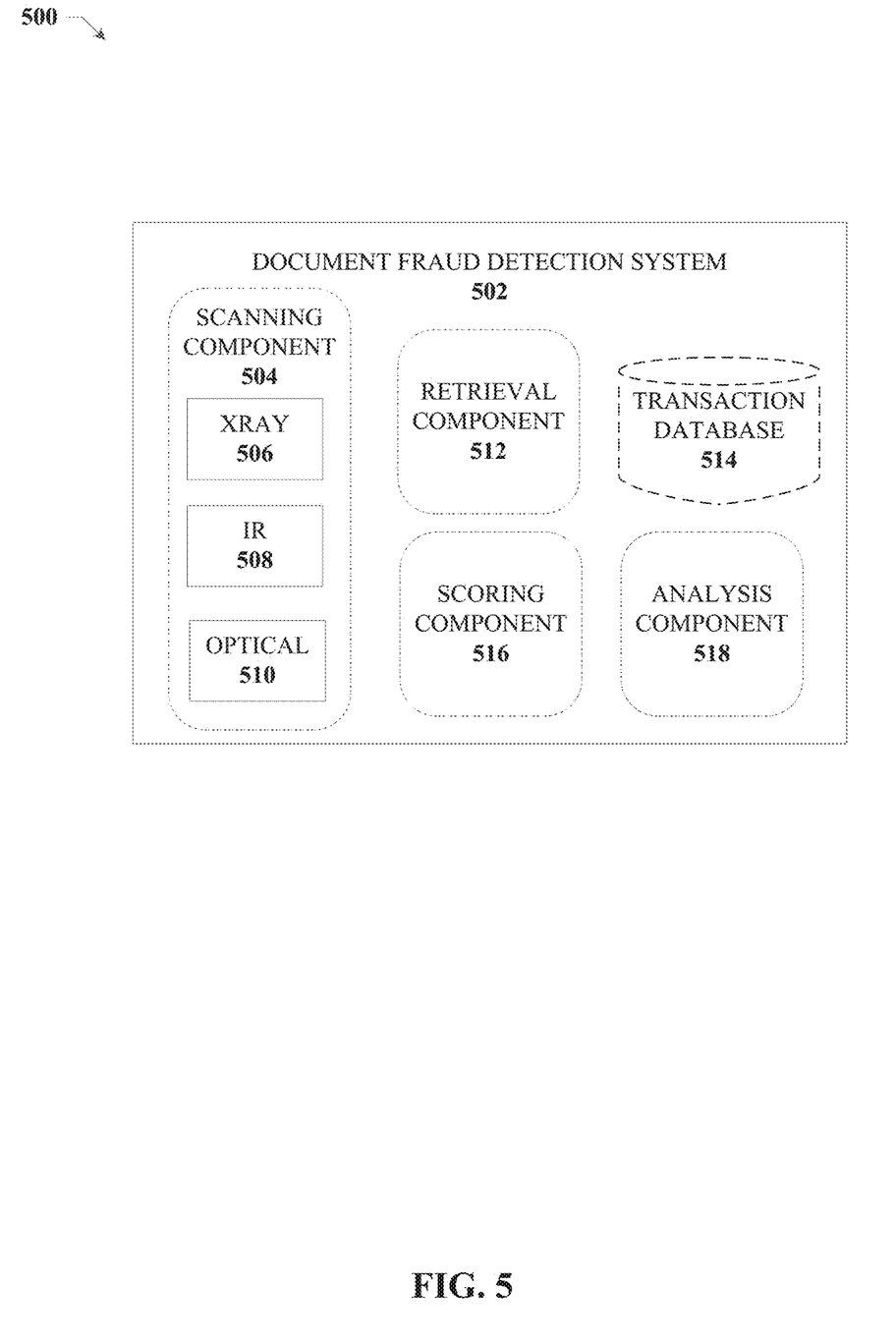
FIG. 5 is an illustration of an example document fraud detection system in accordance with one or more aspects of the disclosure.

Turning now to FIG. 5, illustrated in system 500 is an example document fraud detection system 502 in accordance with one or more aspects of the disclosure. Document fraud detection system 502 can include a scanning component 504 that can have optical scanning device 510, IR device 508, and x-ray device 506 that can record digital images of a financial instrument in a variety of wavelengths. An analysis component 518 can perform image analysis and compare the financial instrument to predetermined document patterns on previous financial instruments, compare transaction details to transaction details on previous transactions, and analyze the thermal and biometric details to predetermined biometric and thermal patterns. A retrieval component 512 can retrieve information about the previous transactions and financial instruments from a transaction database 514 either stored locally or on a financial institution server.

A scoring component 516 can score the deviations of each verification check from the standard or predetermined patterns, and if the combined score of each of the three analyses is above a predetermined score, the scoring component 516 can flag the document as potentially fraudulent. In other embodiments, the scoring component 516 can flag the document as potentially fraudulent in response to any of the scores of the individual checks being above a predetermined threshold. In other embodiments, the scoring component 516 can weight the scores and or checks according to a predetermined pattern and score the results accordingly.

Figure 6:
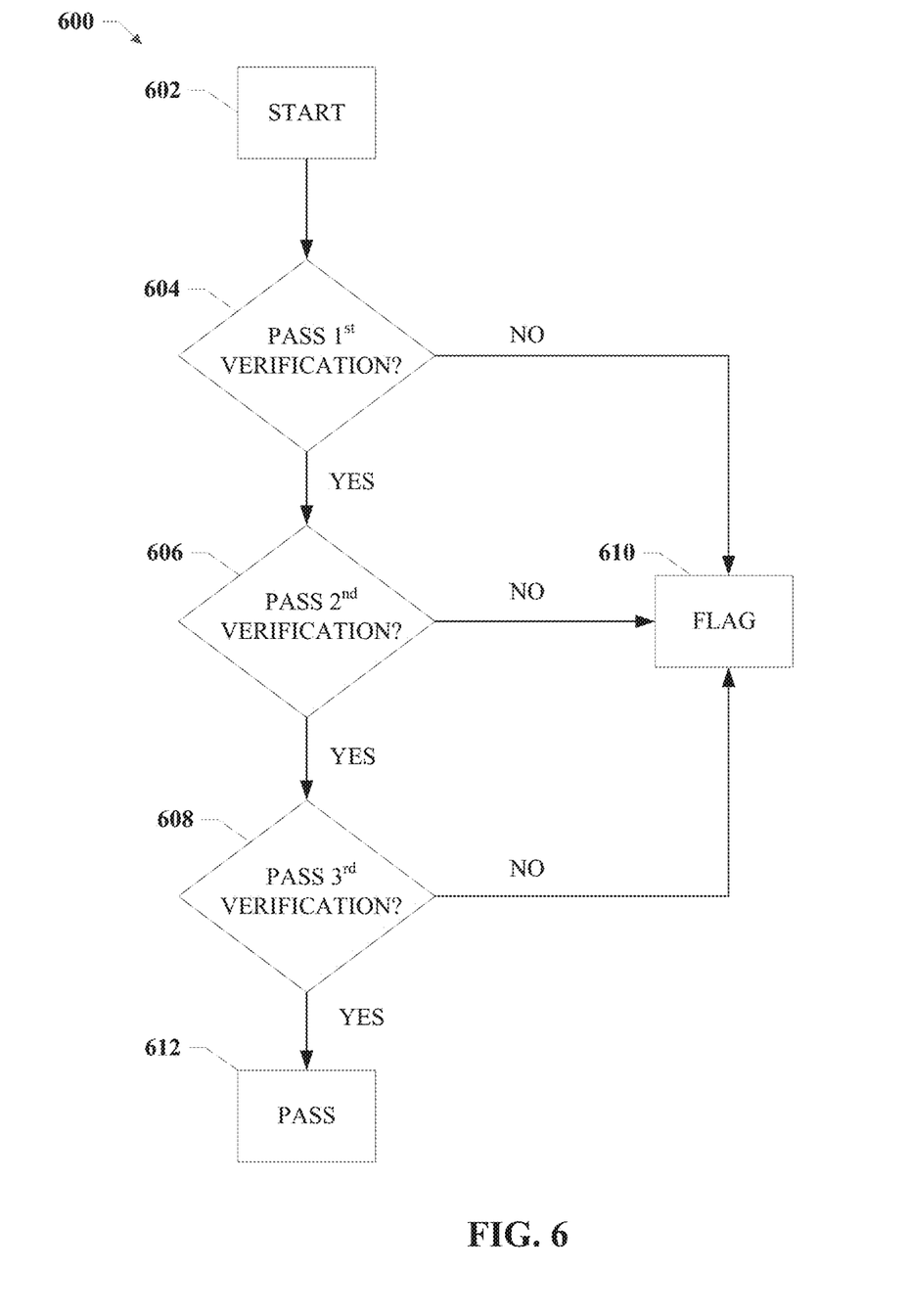
FIG. 6 is an illustration of an example flow chart of a method for identifying potentially fraudulent documents according to one or more embodiments.
Figure 7:
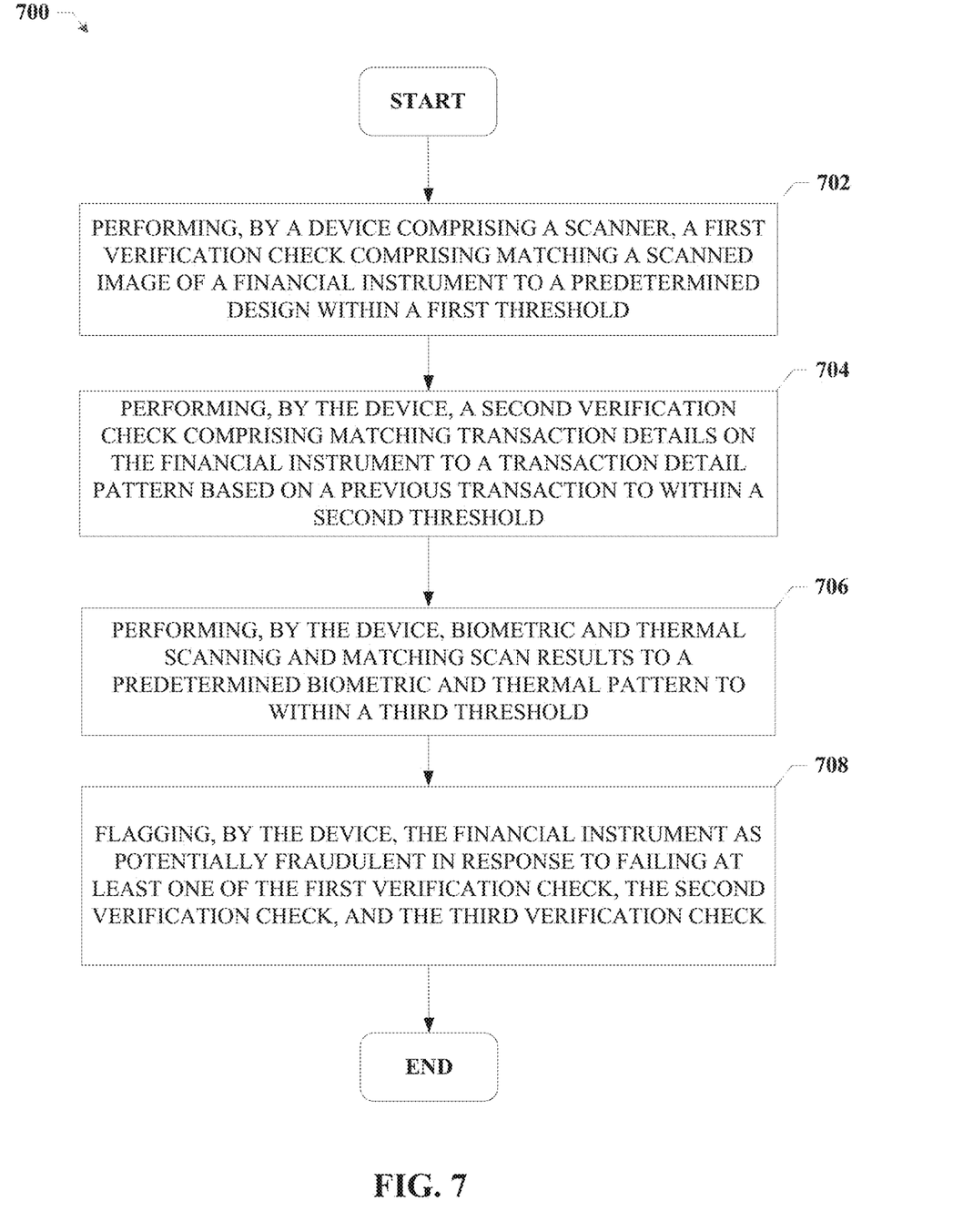
FIG. 7 is an illustration of an example flow chart of a method for identifying potentially fraudulent documents according to one or more embodiments.
Figure 8:
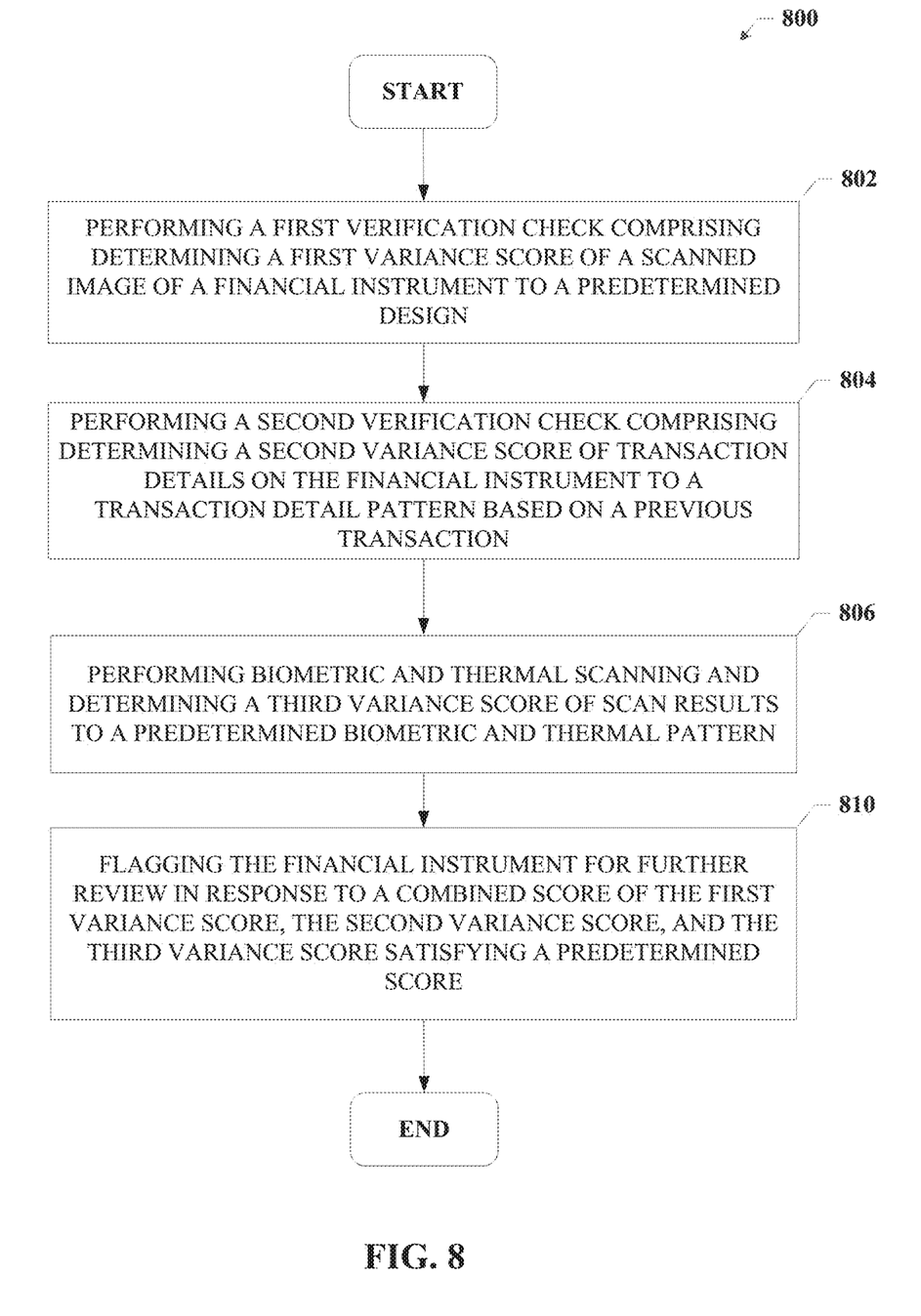
FIG. 8 is an illustration of an example flow chart of a method for identifying potentially fraudulent documents using a scoring system according to one or more embodiments.

FIGS. 6-8 illustrates processes in connection with the aforementioned systems. The process in FIGS. 6-8 can be implemented for example by systems 100, 200, 300, 400, and 500 illustrated in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 6, illustrated is an example flow chart 600 of a method for identifying potentially fraudulent documents according to one or more embodiments, In an embodiment, the process can begin at 602, and the document can be scanned by the imaging devices, thermal, x-ray, optical, and/or UV. At 604 it is determined whether the document passes the first verification check that checks to determine if a pattern of the financial instrument medium matches a predetermined design, wherein if the pattern matches the predetermined design within a first threshold, the document passes the verification check. The document fraud detection device can also score the deviation, and if the deviation is above a predetermined level, the document fails the check, and the process proceeds to 610 where the document is flagged as potentially fraudulent. During the first verification check it is determined whether the document contains multiple layers, and if it does, the process proceeds to the second verification check at 606. It is to be understood that threshold(s) as used herein can be user-, entity- or predefined as desired.

During the second verification check, transaction details on the financial instrument are compared to a transaction detail pattern based on one or more previous transactions, wherein if the transaction details match the transaction detail pattern within a second threshold, the financial instrument passes a second verification check. This can include checking the indents and comparing them to previous transaction details. If the second verification fails, the process continues to 610 where the document is flagged as potentially fraudulent. If the second verification is passed, or if the document does not contain multiple layers, the process continues to the third verification check at 608.

During the third verification check, biometric and thermal scanning is performed and the scan results are compared to a predetermined biometric and thermal pattern; if the scan results match the predetermined biometric and thermal pattern within a third threshold, the financial instrument passes a third verification check and the document passes at 612. If the document fails the third check, the document is flagged at 610.

Turning now to FIG. 7, illustrated an example flow chart of a method 700 for identifying potentially fraudulent documents according to one or more embodiments.

The method can start at 702, where the method includes performing, by a device comprising a scanner, a first verification check comprising matching a scanned image of a financial instrument to a predetermined design within a first threshold.

At 704, the method includes performing, by the device, a second verification check comprising matching transaction details on the financial instrument to a transaction detail pattern based on a previous transaction to within a second threshold.

At 706, the method includes performing, by the device, biometric and thermal scanning and matching scan results to a predetermined biometric and thermal pattern to within a third threshold.

At 708, the method includes flagging, by the device, the financial instrument as potentially fraudulent in response to failing at least one of the first verification check, the second verification check, and the third verification check.

Turning now to FIG. 8, illustrated is an example flow chart of a method 800 for identifying potentially fraudulent documents using a scoring system according to one or more embodiments.

The method can start at 802, where the method includes performing a first verification check comprises, among other steps, determining a first variance score of a scanned image of a financial instrument to a predetermined design. As will be appreciated, in aspects, the variance is a predefined value that could be a business rule. Components, such as 502 and subcomponent 516, could determine the score for assessing if the variation is within the threshold or not.

At 804, the method includes performing a second verification check comprises, among other steps, determining a second variance score of transaction details on the financial instrument to a transaction detail pattern based on a previous transaction. In some embodiments, transaction details include but are not limited to transaction amount, etc.

At 806, the method includes performing biometric and thermal scanning and determining a third variance score of scan results to a predetermined biometric and thermal pattern.

At 808, the method includes flagging the financial instrument for further review in response to a combined score of the first variance score, the second variance score, and the third variance score satisfying a predetermined score.

Figure 9:
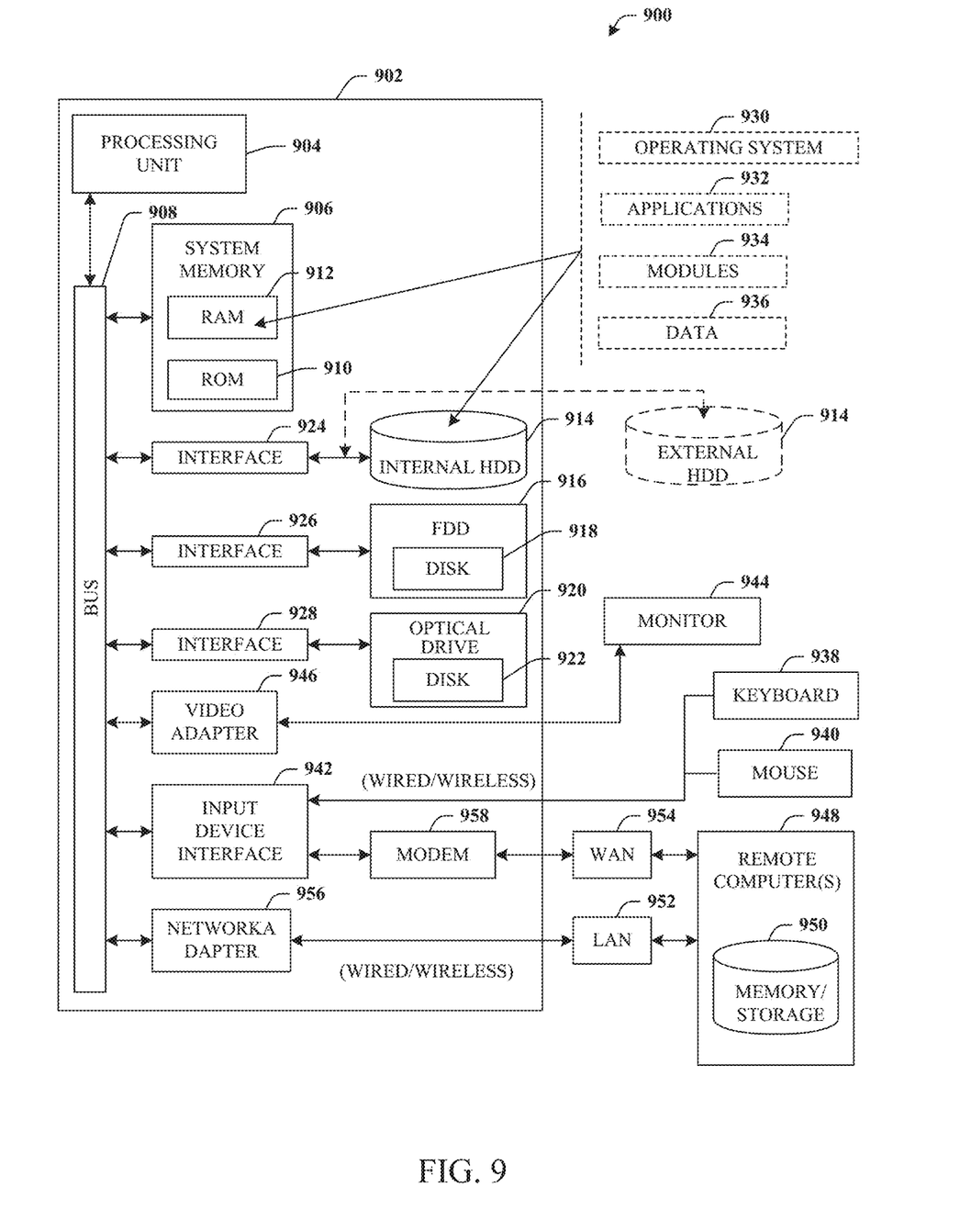
FIG. 9 is an illustration of an example computing environment where one or more of the provisions set forth herein are implemented, according to one or more embodiments.

Referring now to FIG. 9, a block diagram of a computer operable to execute the disclosed architecture is depicted. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random-access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
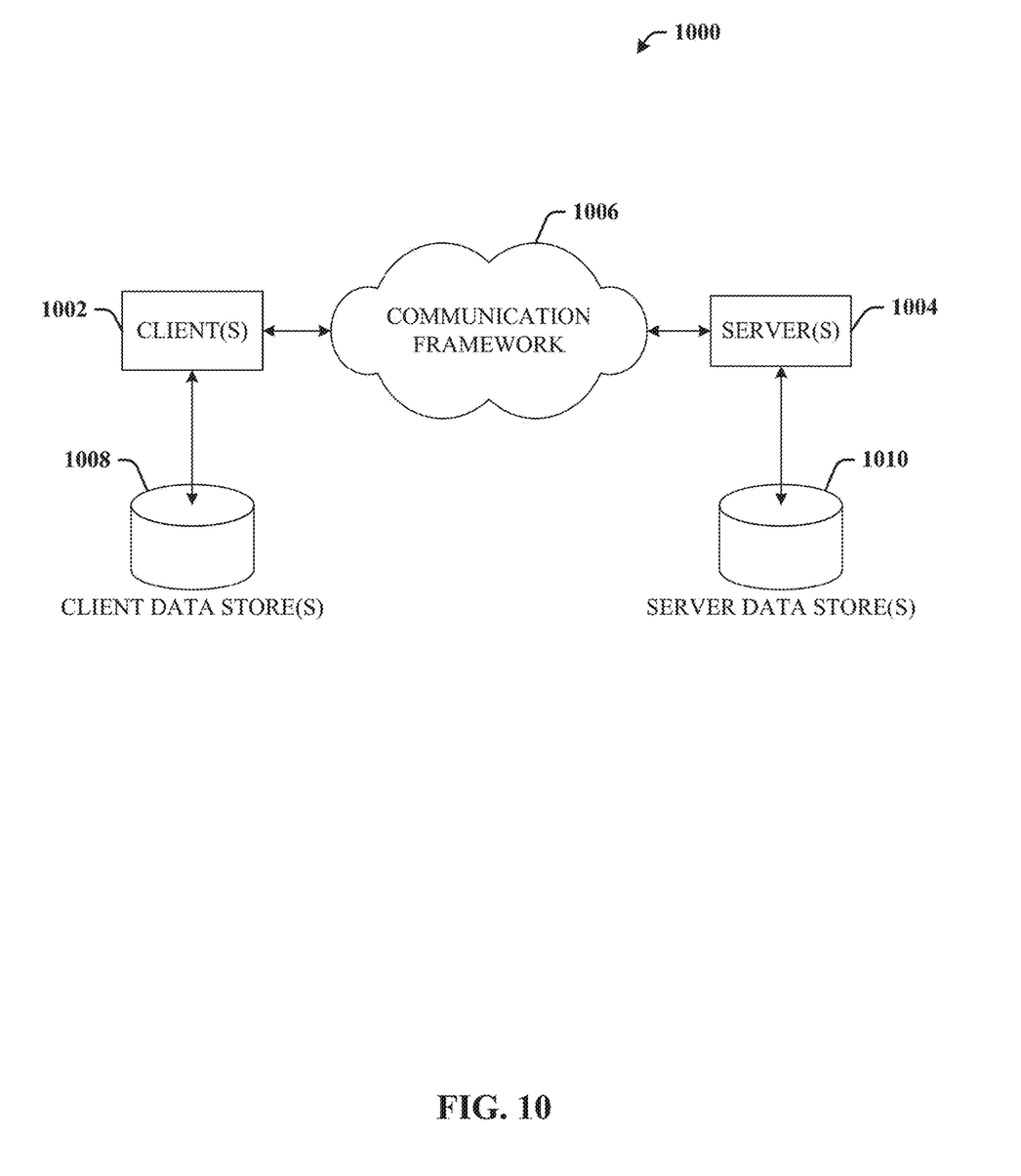
FIG. 10 is an illustration of an example computing environment where one or more of the provisions set forth herein are implemented, according to one or more embodiments.

Referring now to FIG. 10, a schematic block diagram is illustrated of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor coupled to a memory that stores instructions that, when executed by the processor, cause the processor to:
    scan a financial instrument;
    determine a number of layers associated with the financial instrument from a scanned representation of the financial instrument;
    identify a biometric and thermal pattern in the financial instrument;
    determine a degree of similarity between the biometric and thermal pattern identified in the financial instrument and a predetermined biometric and thermal pattern, the degree of similarity determined based on a comparison of the biometric and thermal pattern identified in the financial instrument and the predetermined biometric and thermal pattern; and
    trigger a check of transaction details on the financial instrument when the financial instrument is associated with multiple layers and the degree of similarity is outside of a predetermined degree of similarity.

2. The system of claim 1, wherein at least one of the layers in the number of layers is a writing layer that captures writing that occurs at different times.

3. The system of claim 1, wherein the instructions further cause the processor to:
    identify the transaction details on the financial instrument;
    compare the transaction details to a transaction detail pattern that is based on previous transactions; and
    flag the financial instrument for further review when a result of the comparison is outside a predetermined threshold.

4. The system of claim 1, wherein at least one of the layers in the number of layers is an indentation layer that captures one or more indentations on the financial instrument.

5. The system of claim 4, wherein the instructions further cause the processor to:
    identify text associated with one of the one or more indentations; and
    flag the financial instrument for further review when the text does not match the transaction details of a previous financial instrument.

6. The system of claim 1, wherein the instructions further cause the processor to scan the financial instrument from more than one angle to detect the number of layers.

7. The system of claim 6, wherein the instructions further cause the processor to scan the financial instrument in at least one different lighting condition to detect the number of layers.

8. The system of claim 1, wherein the instructions further cause the processor to:
compare the scanned representation of the financial instrument to a predetermined design to determine a difference; and
flag the financial instrument for further review when the difference exceeds a predetermined threshold.

9. The system of claim 1, wherein the instructions further cause the processor to determine the predetermined biometric and thermal pattern based on one or more sweat marks on a previous financial instrument.

10. The system of claim 1, wherein the instructions further cause the processor to determine the predetermined biometric and thermal pattern based on a heat map of hand contact with a medium of a previous financial instrument.

11. A method, comprising:
scanning a financial instrument;
determining a number of layers associated with the financial instrument from a scanned representation of the financial instrument;
identifying a biometric and thermal pattern in the financial instrument;
determining a degree of similarity between the biometric and thermal pattern identified in the financial instrument and a predetermined biometric and thermal pattern, the degree of similarity determined based on a comparison of the biometric and thermal pattern identified in the financial instrument and the predetermined biometric and thermal pattern; and
triggering a check of transaction details on the financial instrument when the financial instrument is associated with multiple layers or the degree of similarity is outside of a predetermined degree of similarity.

12. The method of claim 11, further comprising:
identifying the transaction details on the financial instrument;
comparing the transaction details to a transaction detail pattern that is based on one or more previous transactions; and
flagging the financial instrument for further review when a result of the comparison is outside a predetermined threshold.

13. The method of claim 11, further comprising:
identifying text associated with one or more indentations on an indentation layer; and
flagging the financial instrument for further review when text does not match the transaction details of a previous financial instrument.

14. The method of claim 11, further comprising scanning the financial instrument from more than one angle or in a different lighting to detect a layer.

15. The method of claim 11, further comprising:
comparing the scanned representation of the financial instrument to a predetermined design to determine a difference; and
flagging the financial instrument for further review when the difference exceeds a predetermined threshold.

16. The method of claim 11, further comprising determining the predetermined biometric and thermal pattern based on one or more sweat marks on a previous financial instrument.

17. The method of claim 11, further comprising determining the predetermined biometric and thermal pattern based on a heat map of hand contact with a medium of a previous financial instrument.

18. A method, comprising:
executing, on a processor, instructions that cause the processor to perform operations comprising:
scanning a financial instrument;
identifying one or more layers associated with the financial instrument from a scanned representation, wherein a layer captures writing that occurs at different times;
identifying a biometric and thermal pattern in the financial instrument;
determining a degree of similarity between the biometric and thermal pattern identified in the financial instrument and a predetermined biometric and thermal pattern, the degree of similarity determined based on a comparison of the biometric and thermal pattern identified in the financial instrument and the predetermined biometric and thermal pattern; and
triggering a check of transactional details on the financial instrument when the financial instrument is associated with multiple layers or the degree of similarity is outside of a predetermined degree of similarity.

19. The method of claim 18, wherein the instructions further cause the processor to perform operations comprising:
identifying the transaction details on the financial instrument;
comparing the transaction details to a transaction detail pattern that is based on one or more previous transactions; and
flagging the financial instrument for further review when a result of the comparison is outside a predetermined threshold.

20. The method of claim 18, wherein the instructions further cause the processor to perform operations comprising:
identifying text associated with one or more indentations on an indentation layer; and
flagging the financial instrument for further review when text does not match the transaction details of a previous financial instrument.

* * * * *